(12) United States Patent
Surnilla et al.

(10) Patent No.: US 6,684,631 B2
(45) Date of Patent: Feb. 3, 2004

(54) METHOD AND SYSTEM FOR REDUCING $NO_X$ TAILPIPE EMISSIONS OF A LEAN-BURN INTERNAL COMBUSTION ENGINE

(75) Inventors: Gopichandra Surnilla, West Bloomfield, MI (US); Jeffrey Scott Hepburn, Birmingham, MI (US); Jerry D. Robichaux, Riverview, MI (US); Michael John Cullen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/323,548

(22) Filed: Dec. 18, 2002

(65) Prior Publication Data
US 2003/0115856 A1 Jun. 26, 2003

Related U.S. Application Data

(63) Continuation of application No. 09/528,216, filed on Mar. 17, 2000, now Pat. No. 6,499,293.

(51) Int. Cl.[7] ............................................. F01N 3/00
(52) U.S. Cl. ........................ 60/285; 60/274; 60/286
(58) Field of Search .................... 60/274, 276, 277, 60/285, 286; 701/201

(56) References Cited

U.S. PATENT DOCUMENTS 4,371,940 A * 2/1983 Yamaki et al. .............. 701/201
5,595,060 A    1/1997 Togai et al.
6,134,883 A   10/2000 Kato et al. .................. 60/285
6,263,666 B1   7/2001 Kubo et al. .................. 60/277

FOREIGN PATENT DOCUMENTS

DE  19607151  7/1997
DE  19850786  2/2000
JP  61234254  10/1986

OTHER PUBLICATIONS

"Dynamic Modeling of a Lean $NO_x$ Trap for Lean Burn Engine Control"; Wang et al.; Proceedings of the American Control Conference, San Diego, CA, Jun. 1999.

* cited by examiner

Primary Examiner—Thomas Denion
Assistant Examiner—Tu M. Nguyen
(74) Attorney, Agent, or Firm—Allan J. Lippa; Kolisch Hartwell, PC

(57) ABSTRACT

A method and apparatus for operating a lean-burn internal combustion engine in cooperation with an exhaust gas purification system having a three-way catalyst and a $NO_x$ trap located downstream of the three-way catalyst includes a controller which calculates current levels of tailpipe $NO_x$ during lean engine operating conditions based upon the difference between a determined instantaneous feedgas $NO_x$ concentration and a determined instantaneous trap efficiency. The controller discontinues lean engine operation when the tailpipe $NO_x$, expressed in terms of either grams-per-mile or grams-per-hour, exceeds a predetermined threshold level, either instantaneously or as averaged over the course of a trap purge-fill cycle.

4 Claims, 1 Drawing Sheet

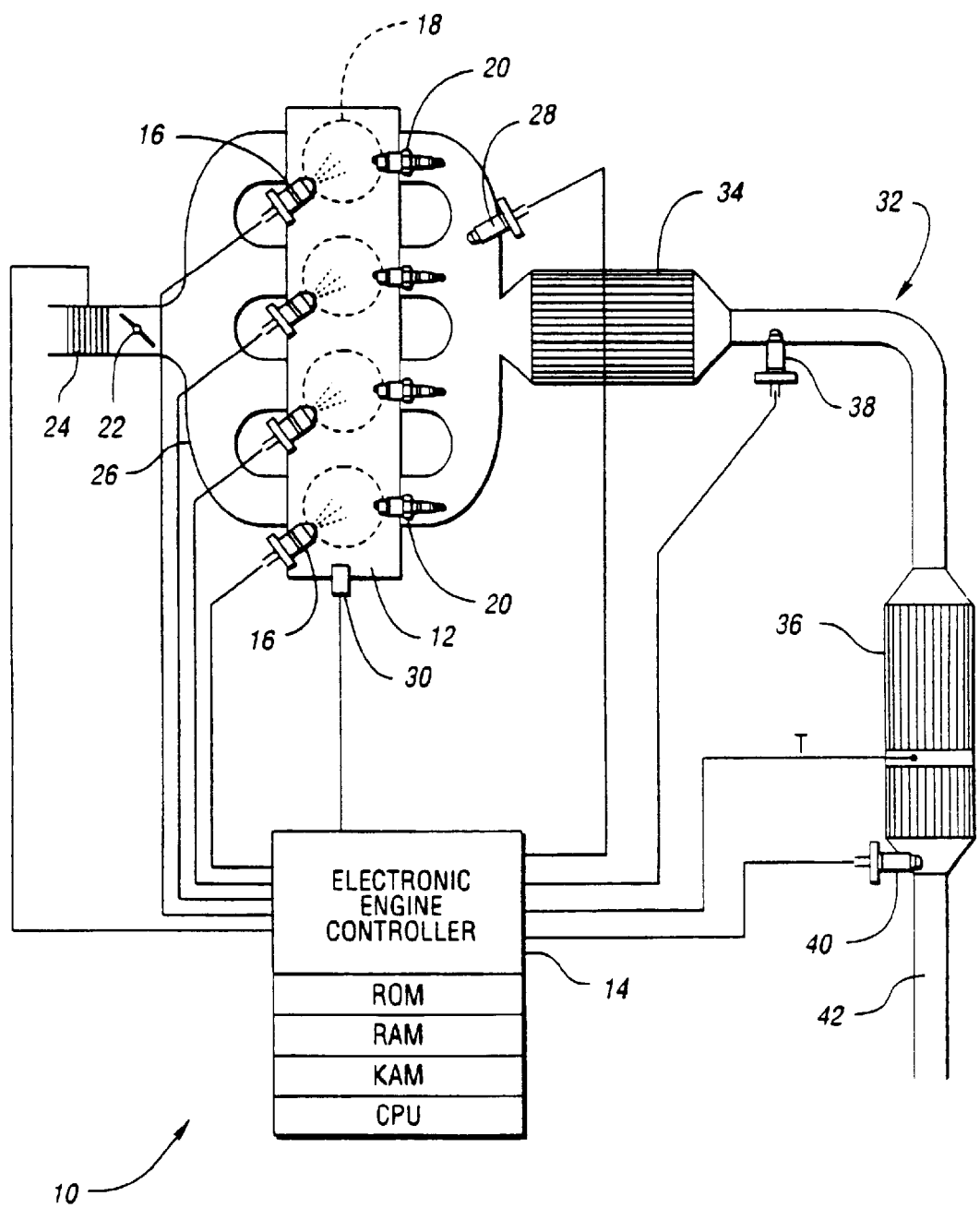

METHOD AND SYSTEM FOR REDUCING NO$_x$ TAILPIPE EMISSIONS OF A LEAN-BURN INTERNAL COMBUSTION ENGINE

This application is a continuation of Ser. No. 09/528,216, titled "Method and Syustem for Reducing NOx tailpipe Emissions of a Lean-Burn Internal Combustion Engine", filed Mar. 17, 2000 now U.S. Pat. No. 6,499,293, the entire contents of which are incorporated herein by reference.

BACKGROUND OF THE INVENTION

1. Field of the Invention

The invention relates to methods and apparatus for controlling the operation of "lean-burn" internal combustion engines used in motor vehicles to obtain improvements in vehicle fuel economy.

2. Background Art

The exhaust gas generated by a typical internal combustion engine, as may be found in motor vehicles, includes a variety of constituent gases, including hydrocarbons (HC), carbon monoxide (CO), nitrogen oxides (NO$_x$) and oxygen (O$_2$). The respective rates at which an engine generates these constituent gases are typically dependent upon a variety of factors, including such operating parameters as air-fuel ratio (8), engine speed and load, engine temperature, ambient humidity, ignition timing ("spark"), and percentage exhaust gas recirculation ("EGR"). The prior art often maps values for instantaneous engine-generated or "feedgas" constituents, such as NO$_x$, based, for example, on detected values for instantaneous engine speed and engine load.

To limit the amount of engine-generated constituent gases, such as HC, CO and NO$_x$, that are exhausted through the vehicle's tailpipe to the atmosphere as "emissions," motor vehicles typically include an exhaust purification system having an upstream and a downstream three-way catalyst. The downstream three-way catalyst is often referred to as a NO$_x$ "trap". Both the upstream and downstream catalyst store NO$_x$ when the exhaust gases are "lean" of stoichiometry and release previously stored NO$_x$, for reduction to harmless gases when the exhaust gases are "rich" of stoichiometry. Typically, such traps include ceria, which characteristically operates to store a quantity of available oxygen during the initial portion of lean engine operation.

Under one prior art approach, the duration of any given lean operating excursion (or its functional equivalent, the frequency or timing of each purge event) is controlled based upon an estimate of how much NO$_x$ has accumulated in the trap since the excursion began. For example, in U.S. Pat. Nos. 5,473,887 and 5,437,153, a controller seeks to estimate the amount of NO$_x$ stored in the trap by accumulating estimates for feedgas NO$_x$ which are themselves obtained from a lookup table based on engine speed, or on engine speed and load (the latter perhaps itself inferred, e.g., from intake manifold pressure). The controller discontinues the lean operating excursion when the total feedgas NO$_x$ measure exceeds a predetermined threshold representing the trap's nominal NO$_x$-storage capacity. In this manner, the prior art seeks to discontinue lean operation, with its attendant increase in engine-generated NO$_x$ before the trap is fully saturated with NO$_x$, because engine-generated NO$_x$ would thereafter pass through the trap and effect an increase in tailpipe NO$_x$ emissions.

However, the disclosed NO$_x$-estimating means fails to account for any instantaneous reduction in trap efficiency, i.e., the trap's ability to store an additional amount of feedgas NO$_x$. The disclosed NO$_x$-estimating means further fails to account for the trap's initial storage of oxygen, which likewise reduces the trap's overall NO$_x$-storing capacity.

The prior art has also recognized that the trap's actual or maximum NO$_x$-storage capacity is a function of many variables, including trap temperature, trap history, sulfation level, and thermal damage, i.e., the extent of damage to the trap's NO$_x$-absorbing materials due to excessive heat. See, e.g., U.S. Pat. No. 5,437,153, which further teaches that, as the trap approaches its maximum capacity, the incremental rate at which the trap absorbs NO$_x$ may begin to fall. Accordingly, U.S. Pat. No. 5,437,153 teaches use of a nominal NO$_x$ capacity which is significantly less than the actual NO$_x$ capacity of the trap, to thereby theoretically provide the trap with a perfect instantaneous NO$_x$-absorbing efficiency, i.e., the trap absorbs all engine-generated NO$_x$, as long as stored NO$_x$ remains below the nominal capacity. A purge event is scheduled to rejuvenate the trap whenever accumulated estimates of engine-generated NO$_x$ reach the nominal trap capacity. Unfortunately, however, the use of such a fixed nominal NO$_x$ capacity necessarily requires a larger trap, because this prior art approach relies upon a partial, e.g., fifty-percent NO$_x$ fill in order to ensure absorption of engine-generated NO$_x$.

Unfortunately, empirical evidence suggests that the instantaneous storage efficiency of the trap, i.e., the trap's instantaneous ability to absorb all of the NO$_x$ being generated by the engine, rarely approaches 100 percent. Indeed, as the trap begins to fill, the instantaneous storage efficiency of the trap appears to decline significantly, with an attendant increase in the amount of NO$_x$ being exhausted to the atmosphere through the vehicle's tailpipe. While increasing the frequency of the purge events may serve to maintain relatively higher trap storage efficiencies, the fuel penalty associated with the purge event's enriched air-fuel mixture and, particularly, the fuel penalty associated with an initial release of oxygen previously stored in the three-way catalyst during lean engine operation, would rapidly negate the fuel savings associated with lean engine operation.

Moreover, under certain engine operating conditions, for example, under high engine speed and high engine load, the NO$_x$ generation rate and correlative exhaust flow rate through the trap are both so high that the trap does not have an opportunity to store all of the NO$_x$ in the exhaust, even assuming a 100 percent trap storage efficiency. As a result, such operating conditions are themselves typically characterized by a significant increase in tailpipe NO$_x$ emissions, notwithstanding the use of the NO$_x$ trap.

When the engine is operated using a fuel containing sulfur, SO$_x$ accumulates in the trap to cause a decrease in both the trap's absolute NO$_x$ capacity and the trap's instantaneous efficiency. When such trap sulfation exceeds a critical level, the accumulated SO$_x$ must be "burned off" or released during a desulfation event, during which trap temperatures are raised above perhaps about 650° C. in the presence of excess HC and CO. By way of example only, U.S. Pat. No. 5,746,049 teaches a trap desulfation method which includes raising the trap temperature to at least 650° C. by introducing a source of secondary air into the exhaust upstream of the $NO_x$ trap when operating the engine with an enriched air-fuel mixture and relying on the resulting exothermic reaction to raise the trap temperature to the desired level to purge the trap of stored $SO_x$.

SUMMARY OF THE INVENTION

It is an object of the invention to provide a method and apparatus for controlling the filling and purging of a $NO_x$ trap which can more accurately regulate overall tailpipe $NO_x$ emissions than prior art methods and apparatus.

In accordance with the invention, a method is provided for controlling the operation of a lean-burn internal combustion engine, the exhaust gas from which is directed through an exhaust purification system including a lean $NO_x$ trap. Under the invention, during lean engine operation, the method includes determining a value representing an incremental amount, in grams per second, of feedgas $NO_x$ generated by the engine as a function of current values for engine speed, engine load or torque, and the lean operating condition's air-fuel ratio. The method also includes determining a value representing the incremental amount of $NO_x$ being instantaneously stored in the trap, preferably, as a function of trap temperature, an amount of $NO_x$ previously stored in the trap, an amount of sulfur which has accumulated within the trap, and a value representing trap aging (the latter being caused by a permanent thermal aging of the trap or the diffusion of sulfur into the core of the trap material which cannot be purged).

The method further includes calculating a value representing instantaneous tailpipe $NO_x$ emissions based on the difference between the feedgas $NO_x$ value and the incremental $NO_x$-storage value; comparing the instantaneous tailpipe $NO_x$ emissions value to a predetermined threshold value; and discontinuing the lean engine operating condition when the instantaneous tailpipe $NO_x$ emissions value exceeds the predetermined threshold level, either instantaneously or as averaged over the course of a trap purge-fill cycle, whose duration is determined by a timer which is nominally reset to zero upon commencement of an immediately prior rich engine operating condition.

In accordance with another feature of the invention, in a preferred embodiment, the method further includes generating a value representative of the cumulative number of miles that the vehicle has traveled during a given trap purge-fill cycle; and determining a value representing average tailpipe $NO_x$ emissions in grams per mile using the instantaneous tailpipe $NO_x$ emissions value and the accumulated mileage value.

In a preferred embodiment, the method further includes determining a need for releasing previously stored $NO_x$ from the trap; and deselecting the trap-filling lean engine operation in response to the determined need. More specifically, under the invention, determining the need for releasing previously stored $NO_x$ includes calculating a value representing the cumulative amount of $NO_x$ stored in the trap during a given lean operation condition based on the incremental $NO_x$-storage value; determining a value representing an instantaneous $NO_x$-storage capacity for the trap; and comparing the cumulative $NO_x$-storage value to the instantaneous $NO_x$ capacity value. In a preferred embodiment, the step of determining the instantaneous $NO_x$ capacity value includes estimating an amount of sulfur which has accumulated within the trap.

Other objects, features and advantages of the present invention are readily apparent from the following detailed description of the best mode for carrying out the invention when taken in connection with the accompanying drawings.

BRIEF DESCRIPTION OF THE DRAWINGS

The Drawing is a schematic of an exemplary system for practicing the invention.

DETAILED DESCRIPTION OF THE PREFERRED EMBODIMENT

An exemplary system 10 for controlling the operation of a lean-burn internal combustion engine 12 in a motor vehicle (not shown) is illustrated in the Drawing. The exemplary system 10 includes an electronic engine controller 14 having a processor or "CPU" 14a; RAM 14b; and ROM 14a, i.e., a processor-readable storage medium which is encoded with executable instructions for controlling the operation of the engine 12. The engine 12 includes a set of fuel injectors 16 whose operation is controlled by the controller 14. The fuel injectors 16, which are of conventional design, are each positioned to inject fuel into a respective cylinder 18 of the engine 12 in precise quantities as determined by the controller 14. The controller 14 similarly controls the individual operation, i.e., timing, of the current directed through each of a set of spark plugs 20 in a known manner.

The controller 14 also controls an electronic throttle 22 that regulates the mass flow of air into the engine 12. An air mass flow sensor 24, positioned at the air intake of engine's intake manifold 26, provides a signal regarding the air mass flow resulting from positioning of the engine's throttle 22. The air flow signal from the air mass flow sensor 24 is utilized by the controller 14 to calculate an air mass value AM which is indicative of a mass of air flowing per unit time into the engine's induction system.

A first oxygen sensor 28 coupled to the engine's exhaust manifold detects the oxygen content of the exhaust gas generated by the engine 12 and transmits a representative output signal to the controller 14. The first oxygen sensor 28 provides feedback to the controller 14 for improved control of the air-fuel ratio of the air-fuel mixture supplied to the engine 12, particularly during operation of the engine 12 at or near the stoichiometric air-fuel ratio ($\lambda=1.00$). A plurality of other sensors, including an engine speed sensor and an engine load sensor, indicated generally at 30, also generate additional signals in a known manner for use by the controller 14. It will be understood that the engine load sensor 30 can be of any suitable configuration, including, by way of example only, an intake manifold pressure sensor, an intake air mass sensor, or a throttle position/angle sensor.

An exhaust system 32 receives the exhaust gas generated upon combustion of the air-fuel mixture in each cylinder 18. The exhaust system 32 includes an upstream three-way catalytic converter ("three-way catalyst 34") and a downstream $NO_x$ trap 36. The three-way catalyst 34 contains a catalyst material that chemically alters the exhaust gas generated by combustion of the supplied air-fuel mixture within the cylinders 18 of the engine 12. The resulting catalyzed exhaust gas is directed past a second oxygen sensor 38, through the trap 36, and past a third oxygen sensor 40. The trap 36 functions in a known manner to reduce the amount of engine-generated $NO_x$ exiting the vehicle tailpipe 42 during lean engine operation, based upon such factors as intake air-fuel ratio, trap temperature T (as determined by a trap temperature sensor, not shown), percentage exhaust gas recirculation, barometric pressure, humidity, instantaneous trap "fullness," instantaneous sulfur poisoning, and trap aging effects (due, for example, to permanent thermal aging, or to the "deep" diffusion of sulfur into the core of the trap material which cannot subsequently be purged). While the invention contemplates the use of second and third oxygen sensors 38 and 40 of any suitable type or configuration, in the exemplary system 10, the second and third oxygen sensors 38,40 are conveniently of the "switching" type.

Upon initialization, which typically occurs no later than the commencement of a trap purge event, except as described in greater detail below, the controller 14 resets a run timer used to track a first time period and adjusts the output of the fuel injectors 16 to thereby achieve a lean air-fuel mixture for combustion within each cylinder 18 having an air-fuel ratio greater than about 1.3 times the stoichiometric air-fuel ratio. In accordance with the invention, for each subsequent background loop of the controller 14 during lean engine operation, the controller 14 determines a value representing the instantaneous rate FG_NOX_RATE at which $NO_x$ is being generated by the engine 12 as a function of instantaneous engine operating conditions, which may include, without limitation, engine speed, engine load, air-fuel ratio, EGR, and spark.

By way of example only, in a preferred embodiment, the controller 14 retrieves a stored estimate FG_NOX_RATE for the instantaneous $NO_x$-generation rate from a lookup table stored in ROM based upon sensed values for engine speed N and engine load LOAD, wherein the stored estimates FG_NOX_RATE are originally obtained from engine mapping data.

During a first engine operating condition, characterized by combustion in the engine 12 of a lean air-fuel mixture (e.g., $\lambda$>1.3), the controller 14 determines incremental or delta feedgas emissions from the engine, in grams/hr, generated since the last time through this loop, and preferably expressed by the following relationship:

*FG_NOX_RATE=FNXXX*1(*N, LOAD*)\**FNXXA*($\lambda$)\**FNXXB*(*EGRACT*)\**FNXXC*(*SPK_DELTA*)\**FMXXD*(*ECT*-200)

where:
FNXXX1(N,LOAD) is a lookup table containing $NO_x$ emission rate values in gram/hr for current engine speed N and engine load LOAD;
FNXXA($\lambda$) is a lookup table for adjusting the FG_NOX_RATE value for air-fuel which inherently adjusts the FG_NOX_RATE value for barometric pressure;

FNXXB(EGRACT) is a lookup table for adjusting the FG_NOX_RATE value for actual exhaust gas recirculation percentage;
FNXXC(SPK_DELTA) is a lookup table for adjusting the FG_NOX_RATE value for the effect of knock sensor or hot open-loop induced spark retard, with $NO_x$ production being reduced with greater spark retard; and
FMXXD(ECT-200) is a lookup table for adjusting the FG_NOX_RATE value for the effect of engine coolant temperature above 200° F.

Preferably, the determined feedgas $NO_x$ rate FG_NOX_RATE is further modified to reflect any reduction in feedgas $NO_x$ concentration upon passage of the exhaust gas through the three-way catalyst 34, as through use of a ROM-based lookup table of three-way catalyst efficiency in reducing $NO_x$ as a function of the current air-fuel ratio $\lambda$, to obtain an adjusted instantaneous feedgas $NO_x$ rate FG_NOX_RATE_ADJ. The adjusted feedgas $NO_x$ rate FG_NOX_RATE_ADJ is accumulated over the length of time t that the engine 12 is operated within a given engine speed/load cell for which the feedgas $NO_x$ generation rate R applies, which is typically assumed to be the duration of the control process's nominal background loop, to obtain a value representing an instantaneous amount FG_NOX_ADJ of feedgas $NO_x$ entering the trap during the background loop.

Also during the lean operating condition, the controller 14 calculates an instantaneous value NOX_INCR representing the incremental amount of $NO_x$ stored in the trap 36 during each background loop executed by the controller 14 during a given lean operating condition, in accordance with the following formula:

$$NOX\_INCR = FG\_NOX\_RATE\_ADJ * t_{i,j} * \mu,$$

where:
$\mu$ represents a set of adjustment factors for instantaneous trap temperature T, open-loop accumulation of $SO_x$ in the trap 36 (which, in a preferred embodiment, is itself generated as a function of fuel flow and trap temperature T), desired trap utilization percentage, and a current estimate of the cumulative amount of $NO_x$ which has already been stored in the trap 36 during the given lean operating condition.

The controller 14 thereafter calculates a value TP_NOX_INST based on the difference between the adjusted instantaneous feedgas $NO_x$ value FG_NOX_ADJ and the instantaneous value NOX_INCR representing the incremental amount of $NO_x$ stored in the trap 36. The controller 14 then compares the value TP_NOX_INST to a predetermined threshold level TP_NOX_MAX. If the controller 14 determines that the instantaneous tailpipe emissions value TP_NOX_INST exceeds the predetermined threshold level TP_NOX_MAX, the controller 14 immediately discontinues the on-going lean engine operating condition in favor of either near-stoichiometric engine operating condition or a trap-purging rich engine operating condition.

In accordance with another feature of the invention, in a preferred embodiment, the method further includes generating a value TP_NOX_TOT representing the cumulative amount of $NO_x$ emitted to the atmosphere during a given trap purge-fill cycle, i.e., since the commencement of an immediately-prior trap-purging rich operating condition; generating a value DISTANCE representing a cumulative number of miles that the vehicle has traveled during the given cycle, as by accumulating detected values VS for vehicle speed over time; and determining a modified value TP_NOX_TOT_MOD representing the average tailpipe $NO_x$ emissions in grams per mile using the cumulative tailpipe emissions value TP_NOX_TOT and the accumulated mileage value DISTANCE.

More specifically, when the system 10 is initially operated with a lean engine operating condition, the efficiency of the trap 36 is very high, and the tailpipe $NO_x$ emissions are correlatively very low. As the trap 36 fills, the trap efficiency begins to fall, the tailpipe $NO_x$ emissions value TP_NOX_INST will slowly rise up towards the threshold value TP_NOX_MAX. However, since the initial portion of the lean engine operating condition was characterized by very low tailpipe $NO_x$ emissions, the lean engine operating condition can be maintained for some time after the instantaneous value TP_NOX_INST exceeds the threshold value TP_NOX_MAX before average tailpipe $NO_x$ emissions exceed the threshold value TP_NOX_MAX. Moreover, since a purge event is likewise characterized by very low instantaneous tailpipe $NO_x$ emissions, average tailpipe $NO_x$ emissions are preferably calculated using a time period which is reset at the beginning of the immediately prior purge event.

In accordance with yet another feature of the invention, when determining the value DISTANCE representing the cumulative number of miles traveled by the vehicle during the given cycle, the controller 14 assumes a minimum vehicle speed VS_MIN to thereby provide a single modified emissions control measure TP_NOX_TOT_MOD, expressed in terms of emissions per effective vehicle mile traveled, applicable to vehicle speeds above and below the minimum vehicle speed VS_MIN, including stopped vehicle conditions.

To the extent that the calculated tailpipe $NO_x$ emissions do not exceed the predetermined threshold level, the controller 14 continues to track trap fill time, as follows: the controller 14 iteratively updates a stored value NOX_STORED representing the cumulative amount of $NO_x$ which has been stored in the trap 44 during the given lean operating condition, in accordance with the following formula:

$$NOX\_STORED=NOX\_STORED+NOX\_INCR$$

The controller 14 further determines a suitable value NOX_CAP representing the instantaneous $NO_x$-storage capacity estimate for the trap 36. By way of example only, in a preferred embodiment, the value NOX_CAP varies as a function of trap temperature T, as further modified by an adaption factor $K_i$ periodically updated during fill-time optimization to reflect the impact of both temporary and permanent sulfur poisoning, trap aging, and other trap-deterioration effects.

The controller 14 then compares the updated value NOX_STORED representing the cumulative amount of $NO_x$ stored in the trap 36 with the determined value NOX_CAP representing the trap's instantaneous $NO_x$-storage capacity. The controller 14 discontinues the given lean operating condition and schedules a purge event when the updated value NOX_STORED exceeds the determined value NOX_CAP. It will be appreciated that, by discontinuing lean engine operation, it is meant that the controller 14 selects a suitable engine operating condition from either a near-stoichiometric operating region or a rich engine operating region, rather than from a lean engine operating region.

For example, in a preferred embodiment, if the controller 14 determines that the value TP_NOX_INST exceeds the predetermined threshold level TP_NOX_MAX, the controller 14 immediately schedules a purge event using an open-loop purge time based on the current value NOX_STORED representing the cumulative amount of $NO_x$ which has been stored in the trap 44 during the preceding lean operating condition. In this regard, it is noted that the instantaneous trap temperature T, along with the air-fuel ratio and air mass flow rate employed during the purge event, are preferably taken into account in determining a suitable open-loop purge time, i.e., a purge time that is sufficient to release substantially all of the $NO_x$ and oxygen previously stored in the trap 36.

As noted above, a temperature sensor is used to directly measure the trap temperature T; however, it will be appreciated that trap temperature may be inferred, for example, in the manner disclosed in U.S. Pat. Nos. 5,894,725 and 5,414,994, which disclosures are incorporated herein by reference.

If, at the end of the purge event, the controller 14 determines that the value TP_NOX_INST continues to exceed the predetermined threshold level TP_NOX_MAX, the controller 14 either selects a near-stoichiometric engine operating condition, or schedules another open-loop purge event.

Preferably, in accordance with another feature of the invention, the controller 14 initializes certain variables in a manner to account for instances where an engine may be turned off for short periods of time during which the trap 36 may not have cooled to ambient temperature. More specifically, rather than assuming that a purge event, with its resulting fuel economy penalty, must be scheduled immediately upon engine start-up in order to assure that a measure representing $NO_x$ stored in the trap 36 may properly be set to a known (zero) value, the controller 14 estimates values NOX_STORED_INIT and SOX_STORED_INIT for the amounts of $NO_x$ and $SO_x$, respectively, which remain stored in the trap 36 at the time of the subsequent engine startup, preferably as a function of one or more operating parameters, such as the respective values for stored $NO_x$ and stored $SO_x$ immediately preceding engine shut-off, a value TEMP_INIT representative of the instantaneous trap temperature at the time of the subsequent engine start-up, and at least one respective calibratable time constant representing an amount of time for the variable to deteriorate to a value corresponding to the passage of a relatively large amount of time.

More specifically, the controller 14 determines the value NOX_STORED_INIT, representing the amount of $NO_x$ remaining in the trap 36 at the time of the subsequent engine start-up as the lower value of either a time-based bleed-estimated value based on the intervening time interval SOAKTIME and the amount of $NO_x$ believed to be stored in the trap 36 at engine shut-down; and a start-up-temperature-based capacity estimate.

Thus, the controller 14 determines a bleed-based trap initialization variable NOX_STORED_BLEED after a soak time SOAKTIME is expressed as follows:

$$NOX\_STORED\_BLEED=NOX\_STORED*FNEXP(-SOAKTIME/NOX\_TIME\_CONST)$$

where:
FNEXP is a lookup table value that approximates an exponential function;
SOAKTIME is the time elapsed since the engine was shut down, in seconds; and
NOX_TIME_CONST is an empirically derived time constant associated with the release from the trap 36 of stored $NO_x$, in seconds.

Because the storage capacity of the trap is typically limited as a function of trap temperature, the controller 14 also determines a temperature-based capacity value NOX_CAP_TEMP as a function of the trap temperature value TEMP_INIT at the time of the subsequent engine start-up, as follows:

$$NOX\_CAP\_TEMP=FNXXXX(TEMP\_INIT))$$

where:
FNXXXX is a lookup table value of mapped values for trap capacity versus trap temperature T; and
TEMP_INIT is a value representing the instantaneous trap temperature T at the time of the subsequent engine start-up.

The controller 14 then estimates the amount NOX_STORED_INIT of $NO_x$ stored in the trap 36 upon engine start-up as follows:

$$NOX\_STORED\_INIT=MIN(NOX\_STORED\_BLEED, NOX\_CAP\_TEMP)$$

where:
MIN(x,y) is a function which selects the lower of the two values, x and y.

While, in the exemplary system 10, the controller 14 preferably samples the output T generated by a temperature sensor to thereby obtain a detected value TEMP_INIT for use in determining the above trap initialization values for remaining $NO_x$ and $SO_x$, the controller 14 alternatively estimates the trap's temperature at the subsequent engine start-up, i.e., after a soak time SOAKTIME using an appropriate algorithm. By way of example only, an exemplary initialization routine for the trap temperature variable TEMP_INIT is preferably expressed as follows:

$$TEMP\_INIT=((TEMP\_PREVIOUS-AMBIENT)*FNEXP(-SOAKTIME/TEMP\_TIME\ CONST)$$

where:
TEMP_PREVIOUS is a value for trap temperature T during the immediately preceding engine operating condition;
AMBIENT is a measured or inferred value representing current ambient temperature;
FNEXP is a lookup table value that approximates an exponential function;
SOAKTIME is the time elapsed since the engine was shut down, in seconds; and
TEMP_TIME_CONST is an empirically derived time constant associated with the cooling-off of the exhaust gas at an identified location on the trap 36, in seconds.

While the best mode for carrying out the invention has been described in detail, those familiar with the art to which this invention relates will recognize various alternative designs and embodiments for practicing the invention within the scope of the appended claims.

What is claimed is:

1. A method for controlling the operation of a lean-burn internal combustion engine, the exhaust gas from the engine being directed through an exhaust purification system including a catalyst, the method comprising:

determining, during a lean engine operating condition, an incremental amount of NOx generated by the engine;

determining an incremental amount of NOx being instantaneously stored in the catalyst;

calculating an estimate of NOx exiting the exhaust purification system based on a difference between said incremental NOx generated by the engine and said incremental amount of NOx being stored in the catalyst;

determining a distance traveled by the vehicle;

calculating an average tailpipe NOx emissions per distance based on said estimate of NOx exiting and said determined distance traveled by the vehicle, said average tailpipe NOx emissions per distance being averaged over a lean/rich cycle; and discontinuing the lean engine operating condition based on said average tailpipe NOx emissions per distance.

2. The method recited in claim 1 wherein said distance is determined based on vehicle speed.

3. The method recited in claim 2 wherein said average tailpipe NOx emissions per distance is calculated even during stopped vehicle conditions.

4. A method for controlling the operation of a lean-burn internal combustion engine, the exhaust gas from the engine being directed through an exhaust purification system including a catalyst, the method comprising:

determining, during a lean engine operating condition, an incremental amount of NOx generated by the engine;

determining an incremental amount of NOx being instantaneously stored in the catalyst;

calculating an estimate of NOx exiting the exhaust purification system based on a difference between said incremental NOx generated by the engine and said incremental amount of NOx being stored in the catalyst;

determining a distance traveled by the vehicle;

calculating an average tailpipe NOx emissions per distance based on said estimate of NOx exiting and said determined distance traveled by the vehicle;

discontinuing the lean engine operating condition based on said average tailpipe NOx emissions per distance;

wherein said distance is determined based on vehicle speed; and wherein said average tailpipe NOx emissions per distance is calculated even during stopped vehicle conditions.

* * * * *